United States Patent
Abdul Kadar et al.

(10) Patent No.: US 10,817,198 B2
(45) Date of Patent: Oct. 27, 2020

(54) METHOD AND SYSTEM FOR REALTIME OPTIMIZATION OF LOAD ON PLURALITY OF BACKUP STORAGE DEVICES

(71) Applicant: Wipro Limited, Bangalore (IN)

(72) Inventors: Mohideen Abdul Kadar, Tiruchirappalli (IN); Chandramohan Achar, Bangalore (IN)

(73) Assignee: Wipro Limited, Bangalore (IN)

( * ) Notice: Subject to any disclaimer, the term of this patent is extended or adjusted under 35 U.S.C. 154(b) by 31 days.

(21) Appl. No.: 16/370,905

(22) Filed: Mar. 30, 2019

(65) Prior Publication Data
US 2020/0264787 A1    Aug. 20, 2020

(30) Foreign Application Priority Data
Feb. 15, 2019   (IN) .............................. 201941006131

(51) Int. Cl.
*G06F 3/06*   (2006.01)
(52) U.S. Cl.
CPC .......... *G06F 3/0631* (2013.01); *G06F 3/0604* (2013.01); *G06F 3/0653* (2013.01); *G06F 3/0683* (2013.01)
(58) Field of Classification Search
CPC .... G06F 3/0604; G06F 3/0631; G06F 3/0653; G06F 3/0683
See application file for complete search history.

(56) References Cited

U.S. PATENT DOCUMENTS

| | | | |
|---|---|---|---|
| 6,430,611 B1 * | 8/2002 | Kita ........................ | H04L 29/06 709/223 |
| 7,305,520 B2 | 12/2007 | Vcigt et al. | |
| 7,529,785 B1 | 5/2009 | Spertus et al. | |
| 9,798,629 B1 * | 10/2017 | Shilane ............... | G06F 11/1464 |
| 2009/0307283 A1 * | 12/2009 | Lehr .................... | G06F 11/1461 |
| 2011/0202735 A1 * | 8/2011 | Kono .................. | G06F 11/1458 711/162 |
| 2017/0364415 A1 * | 12/2017 | Formato ............. | G06F 11/1461 |
| 2018/0210754 A1 | 7/2018 | Vaish et al. | |

* cited by examiner

*Primary Examiner* — Larry T Mackall
(74) *Attorney, Agent, or Firm* — Finnegan, Henderson, Farabow, Garrett & Dunner, LLP (57) ABSTRACT

The present disclosure is related to field of data backup in storage environment, and a method and system for dynamically controlling backup data on storage devices. A data allocating system may pool storage devices and backup data corresponding to client devices. Further performance parameters of storage devices may be evaluated for a pre-set time period based on which a rank is assigned to each of the plurality of storage devices based on performance parameters. Upon assigning the rank, the load characteristics and performance characteristics may be evaluated for each client device for the pre-set time period based on which a performance load index is determined for each client device. Finally, backup data of each client device may be dynamically allocated to each storage device by correlating rank and performance load index. The present disclosure reduces load on single storage device and increases efficiency by reducing delay in backing up data.

20 Claims, 5 Drawing Sheets

METHOD AND SYSTEM FOR REALTIME OPTIMIZATION OF LOAD ON PLURALITY OF BACKUP STORAGE DEVICES

TECHNICAL FIELD

The present subject matter is related in general to the field of data backup in a storage environment, and more particularly, but not exclusively to a method and system for realtime optimization of load on plurality of backup storage devices.

BACKGROUND

A backup storage environment for backing up data may generally refer to disk based appliances bundled with many backup tools for data management and data services. The backup storage environment provides capacity via internal disk based storage media, while the backup tools may schedule one or more policies for backing up data from primary storage environment to the backup storage environment. When the primary storage fails or gets corrupted or data stored in the primary gets corrupted, the data can be recovered from copies stored in the backup storage environment.

Currently, in large Data Centre (DC) enterprises and private cloud environment, sharing backup data across plurality of storage devices is currently a manual task in disk based storage media. When a set of clients are configured to back up against one storage device based on a policy, all the data from the set of clients would be backed up on the same storage device unless the policy is changed, irrespective of load on the storage device. Once in a while, manual efforts may be applied to assess the load on each storage device to proactively route the set of clients to other less utilized storage devices for balancing the load. However, manual assessment may be prone to errors and also the assessment may not be done at regular intervals, thereby leading to unbalanced load on the storage device. Unbalanced load on the storage devices further leads to longer backup window causing unnecessary delay in backing up data. Also, when new load is added for backup, periodic assessment and realignment may require higher manual efforts to manage backup operations, which may cause delay in backing up the data. Further, in the private cloud environment, polices are preconfigured. Therefore, there occurs very limited option for fast customization and manual efforts.

In some of the existing techniques, policies may specify an alternate data path or an alternate storage device to manage the backup operations in scenarios such as device failure. However, such techniques specify only a single data path or a single storage device, which means having a static configuration, which results in insufficient use of resources. Further, such techniques may route the backup data to the alternate storage device only when there is device failure and not for balancing load on the storage devices, thus extending the problem of unbalanced load on the storage devices. Furthermore, in case of device failure, when backup data from many clients are routed towards a single storage device, the storage device may get overloaded, thus affecting performance of the storage device.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

Disclosed herein is a method of realtime optimization of load on plurality of backup storage devices. The method includes pooling, by a data allocating system, a plurality of storage devices and plurality of backup data corresponding to plurality of client devices. Further, the method includes evaluating a plurality of performance parameters of the plurality of storage devices for a pre-set time period. The plurality of performance parameters are at least one of total utilization capacity of the storage device, capacity available for backup on the storage device, busy status of the storage device, trend of backup data observed on the storage device, average throughput of the storage device, current load on the storage device and expected load on the storage device. The expected load on the storage device is evaluated based on prediction of amount of data to be backed up from each of the plurality of client devices in real-time and the trend of the backup data detected on the corresponding storage device. Furthermore, the method includes, assigning a rank to each of the plurality of storage devices based on the plurality of performance parameters. Upon assigning the rank, the method includes evaluating one or more load characteristics and one or more performance characteristics of each of the plurality of client devices for the pre-set time period. Further, the method includes, determining a performance load index for each of the plurality of client devices based on the one or more load characteristics and the one or more performance characteristics. Finally, the method includes allocating dynamically, the plurality of backup data of each of the plurality of client devices to each of the plurality of storage devices by correlating, the rank assigned to each of the plurality of storage devices and the performance load index of the corresponding plurality of client devices.

Further, the present disclosure comprises a data allocating system for dynamically controlling plurality of backup data on plurality of storage devices. The data allocating system comprises a processor and a memory communicatively coupled to the processor. The memory stores the processor-executable instructions, which, on execution, causes the processor to pool a plurality of storage devices and plurality of backup data corresponding to plurality of client devices. Further, the processor evaluates a plurality of performance parameters of the plurality of storage devices for a pre-set time period. The plurality of performance parameters are at least one of total utilization capacity of the storage device, capacity available for backup on the storage device, busy status of the storage device, trend of backup data observed on the storage device, average throughput of the storage device, current load on the storage device and expected load on the storage device. The expected load on the storage device is evaluated based on prediction of amount of data to be backed up from each of the plurality of client devices in real-time and the trend of the backup data detected on the corresponding storage device. Furthermore, the processor assigns a rank to each of the plurality of storage devices based on the plurality of performance parameters. Upon assigning the rank, the processor evaluates one or more load characteristics and one or more performance characteristics of each of the plurality of client devices for the pre-set time period. Further, the processor determines a performance load index for each of the plurality of client devices based on the one or more load characteristics and the one or more performance characteristics. Finally, the processor allocates dynamically, the plurality of backup data of each of the plurality of client devices to each of the plurality of storage devices by correlating, the rank assigned to each of the plurality of storage devices and the performance load index of the corresponding plurality of client devices.

In another embodiment, a non-transitory computer-readable storage medium for realtime optimization of load on plurality of backup storage devices, which when executed by a computing device, cause the computing device to pool, a plurality of storage devices and plurality of backup data corresponding to plurality of client devices. Further, the operation includes evaluating a plurality of performance parameters of the plurality of storage devices for a pre-set time period. The plurality of performance parameters are at least one of total utilization capacity of the storage device, capacity available for backup on the storage device, busy status of the storage device, trend of backup data observed on the storage device, average throughput of the storage device, current load on the storage device and expected load on the storage device. The expected load on the storage device is evaluated based on prediction of amount of data to be backed up from each of the plurality of client devices in real-time and the trend of the backup data detected on the corresponding storage device. Furthermore, the operation includes, assigning a rank to each of the plurality of storage devices based on the plurality of performance parameters. Upon assigning the rank, the operation includes evaluating one or more load characteristics and one or more performance characteristics of each of the plurality of client devices for the pre-set time period. Further, the operation includes, determining a performance load index for each of the plurality of client devices based on the one or more load characteristics and the one or more performance characteristics. Finally, the operation includes allocating dynamically, the plurality of backup data of each of the plurality of client devices to each of the plurality of storage devices by correlating, the rank assigned to each of the plurality of storage devices and the performance load index of the corresponding plurality of client devices.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DIAGRAMS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagram herein represents conceptual views of illustrative systems embodying the principles of the present subject matter. Similarly, it will be appreciated that any flow chart, flow diagram, state transition diagram, pseudo code, and the like represent various processes which may be substantially represented in computer readable medium and executed by a computer or a processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure provides a method and a system for dynamically controlling plurality of backup data on plurality of storage devices. A data allocating system may be associated with plurality of client devices and plurality of storage devices. In some embodiments, the plurality of client devices may be devices that provide data for backup. As an example, the plurality of client devices may include, but not limited to, a server, a laptop, a desktop, a tablet and a mobile. In some embodiments, the plurality of storage devices may be devices that backup and store the data received from each of the plurality of client devices. As an example, the plurality of storage devices may include, but not limited to, disk based storage media. The data allocating system may initially pool the plurality of storage devices and plurality of backup data corresponding to the plurality of client devices such that the plurality of back up data is not assigned to a single or specific storage device. Further, the data allocating system may evaluate a plurality of performance parameters of the plurality of storage devices for a pre-set time period, based on which a rank may be assigned to each of the plurality of storage devices. In some embodiments, the rank may indicate level of utilization of a particular storage device.

Further, the data allocating system may evaluate one or more load characteristics and one or more performance characteristics of each of the plurality of client devices for the pre-set time period, based on which a performance load index may be determined for each of the plurality of client devices. In some embodiments, the performance load index may indicate a backup window required for backing up the plurality of backup data of the client device and a probability of exceeding the backup window based on performance of the client device. Further, the data allocating system may dynamically allocate the plurality of backup data of each of the plurality of client devices to each of the plurality of storage devices by correlating, the rank assigned to each of the plurality of storage devices and the performance load index of the corresponding plurality of client devices.

The dynamic allocation of the plurality of backup data based on the rank and the performance load index ensures balancing the load across the plurality of storage devices. Also, dynamic allocation decouples dependency of a client device on a particular storage device for backing up data. Since the dynamic allocation considers both performance and load aspects of the client devices, as well as the plurality of storage devices, this eliminates unnecessary delays while backing up data. Further, the present disclosure eliminates the requirement of manual efforts for periodic assessment and realignment of load on each of the plurality of storage devices, thereby eliminating errors that may occur due to manual intervention. The present disclosure also predicts amount of backup data that may be available for backup based on trend of the backup data and other related parameters, that helps in planning an appropriate storage device for backing up the data prior to the backup window. Further, the present disclosure helps in efficiently managing the backup operations when plurality of storage devices run short of capacity available to backup incoming data, when performance of at least one of the plurality of storage devices degrades or does not meet required performance for expected load, and when at least one of the plurality of storage devices is not available for backing up new backup data. Furthermore, the data allocating system is robust and provides ease of integration as the automated pooling of storage devices enables horizontal scaling without any configurational modifications.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
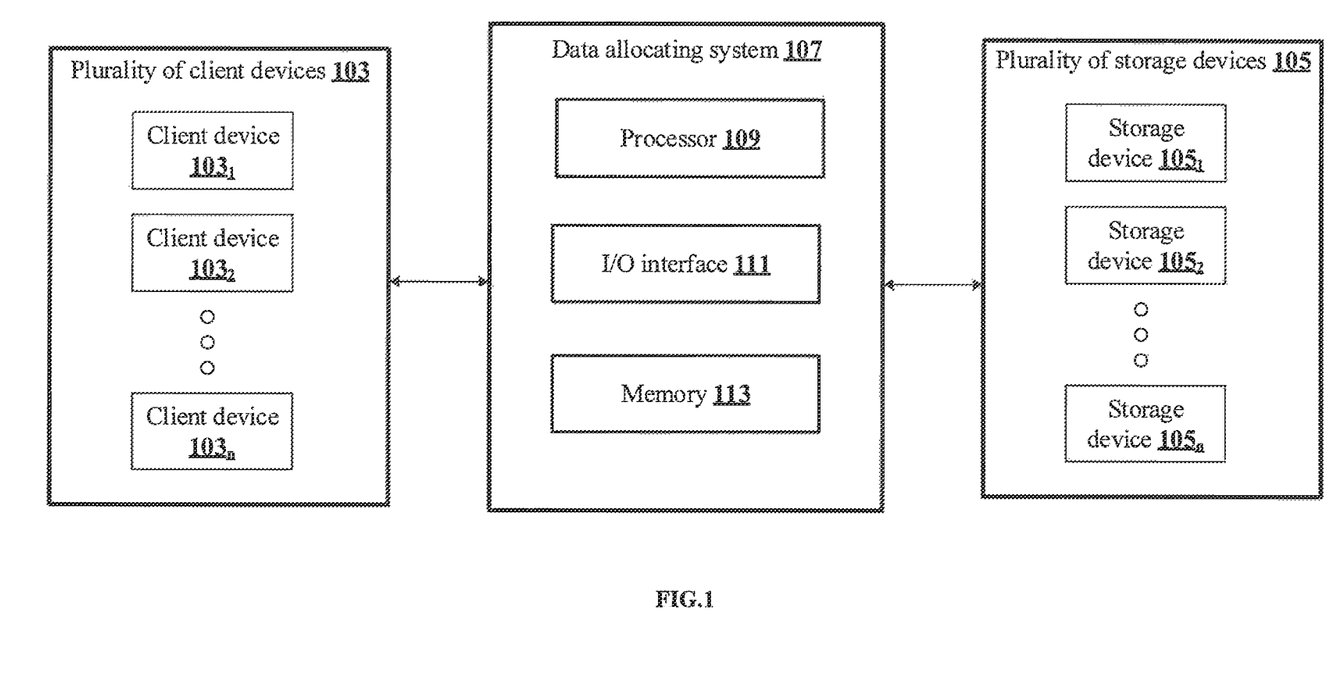
FIG. 1 shows an exemplary architecture for dynamically controlling plurality of backup data on plurality of storage devices in accordance with some embodiments of the present disclosure.

FIG. 1 shows an exemplary architecture for dynamically controlling plurality of backup data on plurality of storage devices in accordance with some embodiments of the present disclosure. The architecture 100 comprises client devices 103$_1$ to 103$_n$ (also referred as plurality of client devices 103 or client device/s 103), storage devices 105$_1$ to 105$_n$ (also referred as plurality of storage devices 105 or storage device/s 105) and a data allocating system 107. In some embodiments, the plurality of client devices 103 may be devices that provide plurality of backup data for backup. As an example, the plurality of client devices 103 may include, but not limited to, a server, a laptop, a desktop, a tablet and a mobile. In some embodiments, the plurality of storage devices 105 may be devices that backup and store the plurality of backup data received from each of the plurality of client devices 103. As an example, the plurality of storage devices 105 may include, but not limited to, disk based storage media. In some embodiments, the plurality of storage devices 105 may be locally or remotely associated with the plurality of client devices 103. Further, the data allocating system 107 may be associated with the plurality of client devices 103 and the plurality of storage devices 105 via a communication network. In some embodiments, the communication network may be at least one of wired communication network and a wireless communication network.

In some embodiments, the data allocating system 107 may include a processor 109, an Input/Output (I/O) interface 111 and a memory 113. The I/O interface 111 may be configured to access monitored data related to the plurality of client devices 103 and the plurality of storage devices 105. As an example, the monitored data may include, but not limited to, data related to performance, configuration and utilization of the plurality of client devices 103 and data related to performance, configuration and utilization of the plurality of storage devices 105. The processor 109 may initially pool the plurality of storage devices 105 and plurality of backup data corresponding to each of the plurality of client devices 103 to decouple one-to-one dependency of the plurality of client devices 103 on the plurality of storage devices 105. Further, the processor 109 may evaluate a plurality of performance parameters of the plurality of storage devices 105 for a pre-set time period. As an example, the plurality of performance parameters may include, but not limited to, total utilization capacity of the storage device 105, capacity available for backup on the storage device 105, busy status of the storage device 105, trend of backup data observed on the storage device 105, average throughput of the storage device 105, current load on the storage device 105 and expected load on the storage device 105. Further, the processor 109 may assign a rank to each of the plurality of storage devices 105. In some embodiments, the rank may indicate level of utilization of a particular storage device 105. In some embodiments, the rank assigned to each of the plurality of storage devices 105 is directly proportional to capacity available for backup on the corresponding storage device 105, the plurality of performance parameters of the storage device 105 and extent of utilization of the corresponding storage device 105.

Further, the processor 109 may evaluate one or more load characteristics and one or more performance characteristics of each of the plurality of client devices 103 for the pre-set time period. In some embodiments, the one or more load characteristics may be factors that define the plurality of backup data. As an example, the one or more load characteristics may include, but not limited to, amount of backup data, type of the backup data, number of files in the backup data, size of the files and blocks in the backup data, database source, the trend of the backup data and amount of redundant data. In some embodiments, the one or more performance characteristics may be factors that affect performance of the plurality of client devices 103. As an example, the one or more performance characteristics may include, but not limited to, Central Processing Unit (CPU) availability, memory availability, trend of throughput and network availability at the plurality of client devices 103 for copying the plurality of backup data from the plurality of client devices 103 to the plurality of storage devices 105 in the pre-set time period.

Further, the processor 109 may determine a performance load index for each of the plurality of client devices 103 based on the one or more load characteristics and one or more performance characteristics of each of the plurality of client devices 103. In some embodiments, the performance load index may indicate a backup window required for backing up the plurality of backup data of the corresponding client device 103 and a probability of exceeding the backup window based on the one or more performance characteristics of the client device 103. Finally, the processor 109 may dynamically allocate the plurality of backup data of each of the plurality of client devices 103 to each of the plurality of storage devices 105 by correlating the rank assigned to each of the plurality of storage devices 105 and the performance load index of the corresponding plurality of client devices 103.

Figure 2A:
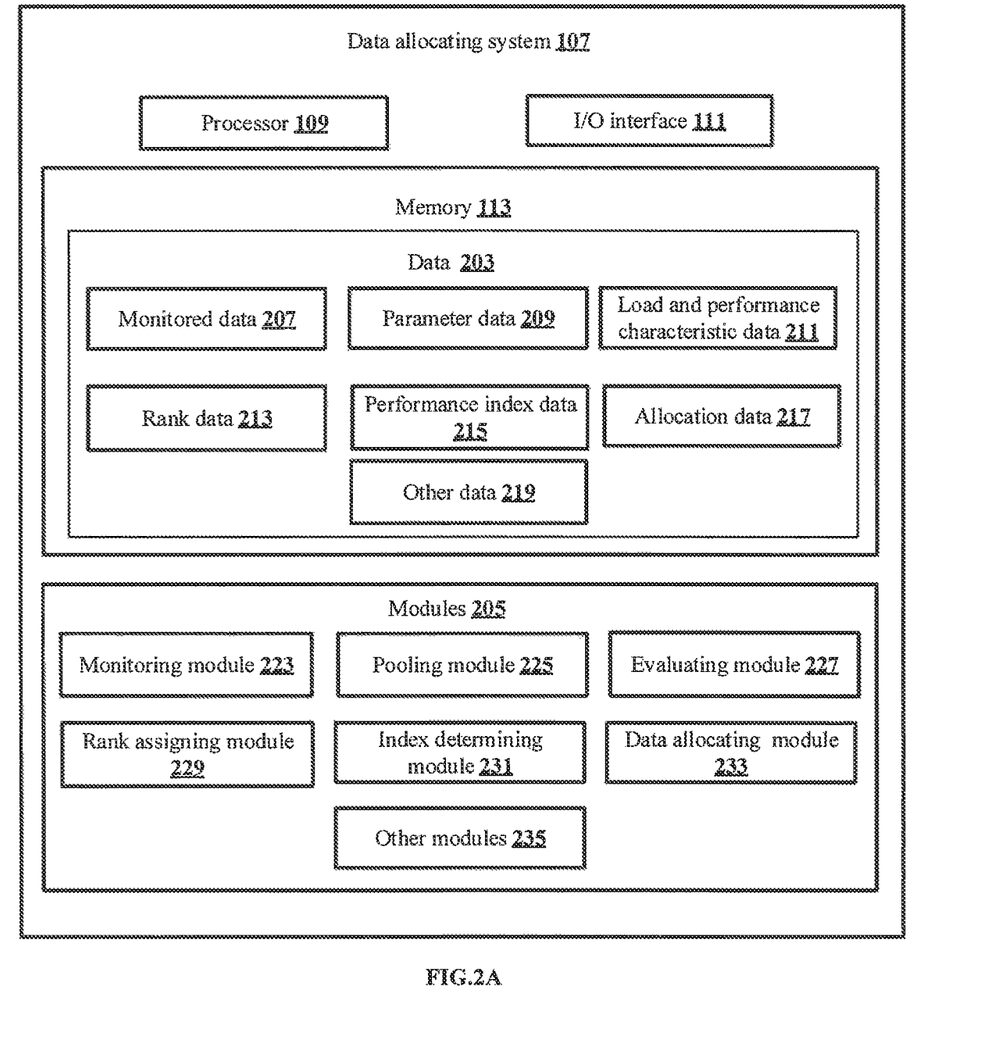
FIG. 2A shows a detailed block diagram of a data allocating system for dynamically controlling plurality of backup data on plurality of storage devices in accordance with some embodiments of the present disclosure.

FIG. 2A shows a detailed block diagram of a data allocating system for dynamically controlling plurality of backup data on plurality of storage devices in accordance with some embodiments of the present disclosure.

In some implementations, the data allocating system 107 may include data 203 and modules 205. As an example, the data 203 may be stored in a memory 113 configured in the data allocating system 107 as shown in the FIG. 2A. In one embodiment, the data 203 may include monitored data 207, parameter data 209, load and performance characteristic data 211, rank data 213, performance index data 215, allocation data 217 and other data 219. In the illustrated FIG. 2A, modules 205 are described herein in detail.

In some embodiments, the data 203 may be stored in the memory 113 in form of various data structures. Additionally, the data 203 can be organized using data models, such as relational or hierarchical data models. The other data 219 may store data, including temporary data and temporary files, generated by the modules 205 for performing the various functions of the data allocating system 107.

In some embodiments, the data 203 stored in the memory 113 may be processed by the modules 205 of the data allocating system 107. The modules 205 may be stored within the memory 113. In an example, the modules 205 communicatively coupled to the processor 109 configured in the data allocating system 107, may also be present outside the memory 113 as shown in FIG. 2A and implemented as hardware. As used herein, the term modules 205 may refer to an application specific integrated circuit (ASIC), an electronic circuit, a processor (shared, dedicated, or group) and memory that execute one or more software or firmware programs, a combinational logic circuit, and/or other suitable components that provide the described functionality.

In some embodiments, the modules 205 may include, for example, a monitoring module 223, a pooling module 225, an evaluating module 227, rank assigning module 229, an index determining module 231, a data allocating module 233 and other modules 235. The other modules 235 may be used to perform various miscellaneous functionalities of the data allocating system 107. It will be appreciated that such aforementioned modules 205 may be represented as a single module or a combination of different modules.

In some embodiments, the monitoring module 223 may continuously monitor plurality of client devices 103 and plurality of storage devices 105 associated with the data allocating system 107. An I/O interface 111 of the data allocating system 107 may access monitored data 207 provided by the monitoring module 223. As an example, the monitored data 207 may include, but not limited to, data related to performance, configuration and utilization of the plurality of client devices 103 and data related to performance, configuration and utilization of the plurality of storage devices 105.

In some embodiments, the pooling module 225 may pool the plurality of storage devices 105 and plurality of backup data corresponding to each of the plurality of client devices 103. In some embodiments, the pooling of the plurality of storage devices 105 and the plurality of backup data may decouple one-to-one dependency of the plurality of client devices 103 on the plurality of storage devices 105.

Further, the evaluating module 227 may evaluate a plurality of performance parameters of the plurality of storage devices 105 for a pre-set time period. In some embodiments, the evaluating module 227 may evaluate the plurality of performance parameters using the monitored data 207. As an example, the plurality of performance parameters may include, but not limited to, total utilization capacity of the storage device 105, capacity available for backup on the storage device 105, busy status of the storage device 105, trend of backup data observed on the storage device 105, average throughput of the storage device 105, current load on the storage device 105 and expected load on the storage device 105. In some embodiments, the expected load on the storage device 105 may be evaluated based on prediction of amount of data to be backed up from each of the plurality of client devices 103 in real-time and the trend of the backup data detected on the corresponding storage device 105. In some embodiments, the evaluating module 227 may predict the amount of data to be backed up based on the monitored data 207. In some other embodiments, the evaluating module 227 may request the plurality of client devices 103 to share the amount of backup data which is meant to be backed up for the purpose of prediction. The plurality of performance parameters of the plurality of storage devices 105 may be stored as the parameter data 209.

Further, the evaluating module 227 may evaluate one or more load characteristics and one or more performance characteristics of each of the plurality of client devices 103 for the pre-set time period. In some embodiments, the one or more load characteristics may be factors that define the plurality of backup data. As an example, the one or more load characteristics may include, but not limited to, amount of backup data, type of the backup data, number of files in the backup data, size of the files and blocks in the backup data, database source, the trend of the backup data and amount of redundant data. In some embodiments, the one or more performance characteristics may be factors that affect performance of the plurality of client devices 103. As an example, the one or more performance characteristics may include, but not limited to, Central Processing Unit (CPU) availability, memory availability, trend of throughput and network availability at the plurality of client devices 103 for copying the plurality of backup data from the plurality of client devices 103 to the plurality of storage devices 105 in the pre-set time period. In some embodiments, the one or more load characteristics and the one or more performance characteristics of each of the plurality of client devices 103 may be stored as the load and performance characteristic data 211.

Upon evaluating the parameter data 209 and the load and performance characteristic data 211, the rank assigning module 229 may assign a rank to each of the plurality of storage devices 105 based on the plurality of performance parameters i.e. the parameter data 209. The rank assigned to each of the plurality of storage devices 105 may indicate level of utilization of a particular storage device 105. In some embodiments, the rank assigned to each of the plurality of storage devices 105 may be directly proportional to capacity available for backup on the corresponding storage device 105, the plurality of performance parameters of the storage device 105 and extent of utilization of the corresponding storage device 105. A lower rank may be assigned to the storage device 105 which is less utilized. As an example, consider 4 storage devices, storage device 1, storage device 2 and storage device 3 which are assigned with rank 2, rank 3 and rank 1 respectively. Therefore, rank 1 indicates that storage device 3 is least utilized when compared to the storage devices 1 and 2. Further, rank 2 indicates that the storage device 1 has slightly higher utilization when compared to the storage device 3 but is less utilized when compared to the storage device 2. In some embodiments, the rank assigned to each of the plurality of storage devices 105 may vary dynamically based on the plurality of backup data allocated to each of the plurality of storage devices 105. The rank assigned to each of the plurality of storage devices 105 may be stored as the rank data 213.

Further, the index determining module 231 may determine a performance load index for each of the plurality of client devices 103 based on the one or more load characteristics and one or more performance characteristics of each of the plurality of client devices 103. In some embodiments, the performance load index may indicate a backup window required for backing up the plurality of backup data of the corresponding client device 103 and a probability of exceeding the backup window based on the one or more performance characteristics of the client device 103.

The index determining module 231 may determine the backup window required for backing up the plurality of backup data of the corresponding client device 103 using the below Equation 1.

$$AD = D*8/CT/C \qquad \text{Equation 1}$$

In the above Equation 1,
"AD" indicates backup window required for backing up the plurality of backup data;
"D" indicates the amount of the plurality of backup data to be backed up;
"CT" indicates the trend of throughput; and
"C" indicates the compression factor.
In some embodiments, value associated with the compression factor may indicate whether files in the plurality of backup data are in a compressed state.

The index determining module 231 may determine the probability of exceeding the backup window based on the one or more performance characteristics of the client device 103 using the below Equation 2.

$$RC = F*S \qquad \text{Equation 2}$$

In the above Equation 2,
"RC" indicates Probability of exceeding the backup window
"F" indicates the number of files present in the plurality of backup data to be backed up; and
"S" indicates the trend of CPU availability and memory utilization during the backup window.

In some embodiments, when value associated with probability of exceeding the backup window is same for two client devices 103, the index determining module 231 increment the value by 1 for one of the two client devices 103. In some embodiments, frequency of determining the performance load index for each of the plurality of client devices 103 at time intervals predefined in Service Level Agreement (SLA) of each of the plurality of client devices 103. The performance load index determined for each of the plurality of client devices 103 may be stored as the performance index data 215.

Further, the data allocating module 233 may dynamically allocate the plurality of backup data of each of the plurality of client devices 103 to each of the plurality of storage devices 105 when at least one of the plurality of conditions exist. In some embodiments, the plurality of conditions may include, but not limited to, when at least one of the plurality of storage devices 105 is running short of capacity available to backup incoming backup data, when performance of at least one of the plurality of storage devices 105 degrades or does not meet required performance for the expected load, when at least one of the plurality of storage devices 105 is not available for backing up new backup data. The data allocating module 233 may dynamically allocate the plurality of backup data by correlating the rank assigned to each of the plurality of storage devices 105 and the performance load index of the corresponding plurality of client devices 103, based on one or more predefined allocation policies. As an example, the one or more predefined allocation policies may include, but not limited to, the following:

Based on the trend of the backup data and the amount of the plurality of backup data already assigned to the storage device 105, match the plurality of backup data to be backed up to the storage device 105 which can accommodate the plurality of backup data i.e. which has a time slot free during the backup window to accommodate the plurality of backup data as per the performance load index.

Assign the plurality of backup data corresponding to a single client device 103 to the storage device 105 assigned with least rank.

If the storage device $105_1$ associated with the least rank cannot accommodate backup of the plurality of backup data within the backup window, check whether the storage device $105_2$ assigned with next least rank can accommodate the plurality of backup data within the determined backup window.

If the storage device $105_2$ cannot accommodate the plurality of backup data, continue checking each of the plurality of storage devices 105 in ascending order of the rank assigned to each of the plurality of storage devices 105.

If the storage device $105_1$ or $105_2$ can accommodate the plurality of backup data but have a low performance, the backup window may increase enormously. Therefore, the plurality of backup data may be shifted to another storage device 1053 which is capable of accommodating the plurality of backup data and also matches the required performance parameters.

When multiple client devices 103 have the same backup window, the client devices 103 having lesser probability of exceeding the backup window may be assigned first.

When multiple storage devices 105 match the requirement of the client device 103 for the specified backup window, the storage device 105 that runs less number of tasks or the storage device 105 that is less utilized when compared to other storage devices 105 that match the requirement, may be selected.

Based on such predefined policies, the data allocating module 233 may dynamically allocate the plurality of backup data of each of the plurality of client devices 103 to each of the plurality of storage devices 105. Upon dynamic allocation of the plurality of backup data, the rank assigning module 229 may vary the rank assigned to each of the plurality of storage devices 105 based on current load on the plurality of storage devices 105. The dynamic allocations for backing up the plurality of backup data may be stored as the allocation data 217.

Henceforth, the process of dynamically controlling plurality of backup data on plurality of storage devices 105 is explained with the help of one or more examples for better understanding of the present disclosure. However, the one or more examples should not be considered as a limitation of the present disclosure.

Figure 2B:
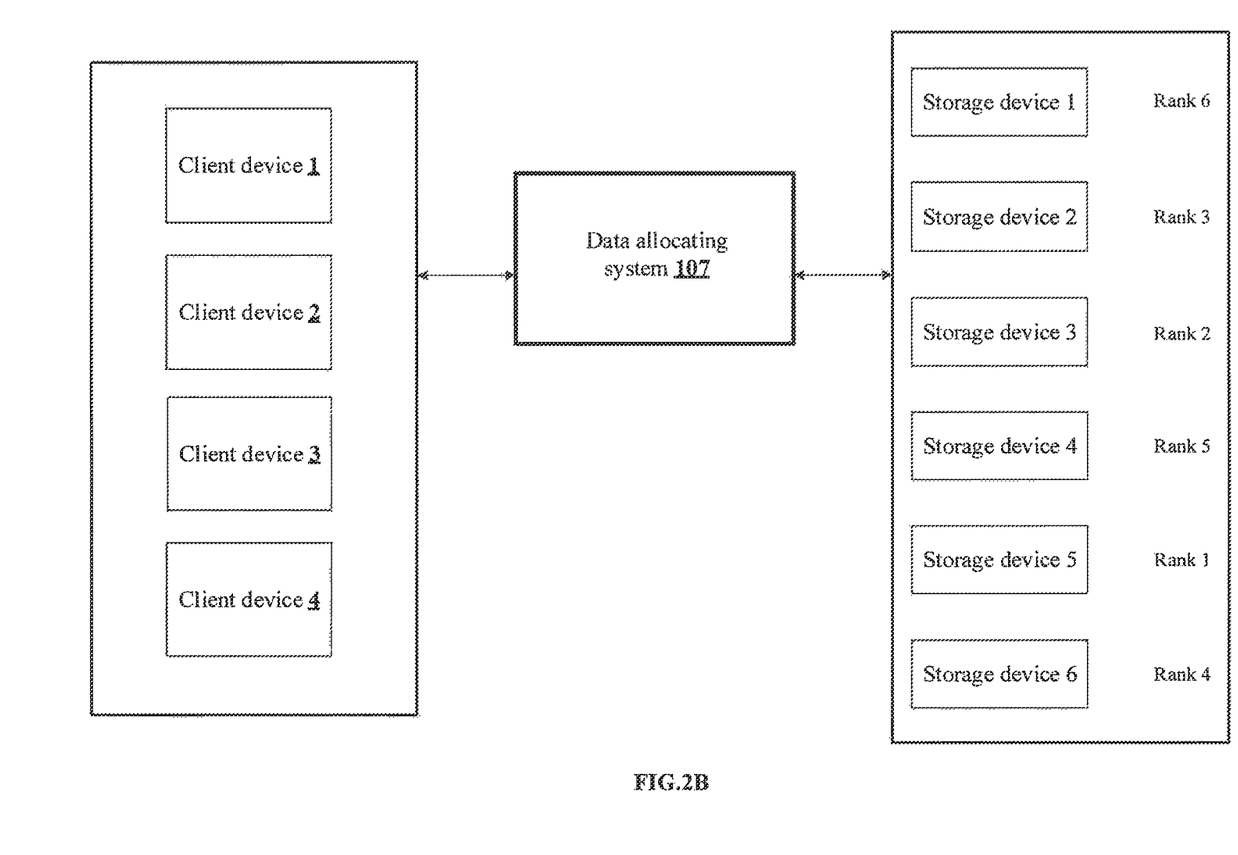
FIG. 2B shows an exemplary scenario for dynamically controlling plurality of backup data on plurality of storage devices in accordance with some embodiments of the present disclosure.

Consider an exemplary scenario including four client devices, client device 1, client device 2, client device 3 and client device 4, and 6 storage devices storage device 1, storage device 2, storage device 3, storage device 4, storage device 5 and storage device 6 as shown in the FIG. 2B. Initially, the plurality of backup data of the four client devices and the plurality of storage devices are pooled, i.e. dependency of the client devices 1-4 on any one storage device 1-6 is decoupled. Further, based on plurality of performance parameters of the storage devices 1-6 evaluated for the pre-set time period of 4 PM-5 PM, consider the rank assigned to the storage devices 1-6 is as shown in the below Table 1.

TABLE 1

| Storage device | Rank |
| --- | --- |
| Storage device 1 | Rank 6 |
| Storage device 2 | Rank 3 |
| Storage device 3 | Rank 2 |
| Storage device 4 | Rank 5 |
| Storage device 5 | Rank 1 |
| Storage device 6 | Rank 4 |

Further, based on the performance and load characteristic data 211, the performance load index of each of the client devices 1-4 in the pre-set time period 4 PM-5 PM may be calculated. Exemplary values of some of the performance characteristics and the load characteristics of client 1 are shown in the below Table 2.

TABLE 2

| Performance/load characteristic of the client device | Measuring unit or values | Weightage (higher the number higher the weightage) | Exemplary Values |
| --- | --- | --- | --- |
| Amount of the plurality of backup data (D) | Mega Bytes | — | 1000 |
| No. of files present in the plurality of backup data to be backed up (F) | No. of files created or number of files modified In case of structured data, the measuring unit may be number of instances | (Total number of files)/ (Amount of the plurality of backup data) - Equation 3 | 10000/ 1000 = 10 |
| Compression factor (C) | Yes or No | Yes - 2 No - 1 | 1 |
| Trend of CPU and Mem utilization in the pre-set time period (S) | $95^{th}$ Percentile of the value | 20% - 10 21 to 40% - 8 41 to 60% - 6 61 to 80% - 4 81 to 100% - 1 | 6 |
| Trend of throughput | 95% percentile of the value during | — | 70 Mbps |

TABLE 2-continued

| Performance/load characteristic of the client device | Measuring unit or values | Weightage (higher the number higher the weightage) | Exemplary Values |
| --- | --- | --- | --- |
| (CT) | the backup window in Mbps | | |

In the above Table 2, "D" indicates the amount of the plurality of backup data to be backed up which may be measured in megabytes. As an example, value of "D" may be 1000 Megabytes. Further, "F" indicates number of files present in the plurality of backup data to be backed up which may be measured in terms of number of files created or number of files modified. As an example, the value of "F" may be 10 which is calculated using the Equation 3. Furthermore, "C" indicates the compression factor i.e. whether the plurality of backup data is compressed or not. As an example, when the plurality of backup data is compressed, the weightage may be "2" and when the plurality of backup data is not compressed, the weightage may be "1". Further, "S" indicates the trend of CPU availability and memory utilization in the pre-set time period may be measured as $95^{th}$ percentile of a given value. As an example, when $95^{th}$ percentile of the value lies in 20%, the weightage assigned may be 10. Similarly, when $95^{th}$ percentile of the value lies in 21%-40%, the weight assigned may be 8. Further, "CT" indicates the trend of throughput in the pre-set time period i.e. the network availability in the pre-set time period, which may also be measured as $95^{th}$ percentile of a given value. As an example, the value of "CT" may be 70 mbps.

Further, the performance load index of client 1 during the pre-set time period may be determined using the Equations 1 and 2.

As an example, based on the above Table 2, when the exemplary values are substituted in Equation 1, "AD" i.e. the backup window required for backing up the plurality of backup data may be determined as 114.2 seconds.

As an example, based on the above Table 2, when the exemplary values are substituted in Equation 2, "RC" i.e. Probability of exceeding the backup window may be determined as 60. In some embodiments, higher the "RC" value, longer would be the backup window than expected i.e. than "AD" value.

Similarly, the performance load index may be determined for rest of the client devices 2, 3 and 4. As an example, the performance load index of all the clients 1-4 may be as shown in the below Table 3.

TABLE 3

| Client | Performance load index in the pre-set time period |
| --- | --- |
| Client 1 | AD = 114.2 seconds RC = 60 |
| Client 2 | AD = 20 seconds RC = 5 |
| Client 3 | AD = 150 seconds RC = 80 |
| Client 4 | AD = 50 seconds RC = 25 |

The processor 109 may now allocate the plurality of backup data of each of the clients 1-4 to each of the storage devices 1-4 based one or more predefined policies. An exemplary way of allocating the plurality of backup data is illustrated below.

Client device 1 requires AD of 114.2 seconds and RC is determined to be 60. As per Table 2, Consider that to back up the plurality of backup data coming from client device 1 in the specified AD, the storage device should comply with performance requirement of 90 mbps. Among the storage devices 1-6, initially, storage device 5 may be considered since the storage device 5 is assigned with rank 1, which means that the storage device 5 is least utilized when compared to other storage devices. However, consider that, storage device 5 is capable of complying with the performance requirement of 40 mbps in the pre-set time period. Therefore, the plurality of backup data coming from client device 1 may not be assigned to the storage device 5 since the storage device 5 cannot comply to the performance requirement of 80 mbps.

On the other hand, consider that to back up the plurality of backup data coming from client device 2 in the specified AD, the storage device should comply with performance requirement of 30 mbps. Therefore, the plurality of backup data coming from client device 2 may be assigned to the storage device 5, since the performance requirement is only 30 mbps and the storage device 5 is capable of complying with the performance requirement.

Subsequently, the next storage device considered for allocation may be storage device 3 which has been assigned with rank 2. Consider that the storage device 3 is capable of complying with the performance requirement of 80 mbps in the pre-set time period. Therefore, the plurality of backup data coming from client device 1 may be assigned to the storage device 3.

Similarly, the plurality of backup data coming from rest of the client devices 3 and 4 may also be allocated to the storage devices 1-6.

In some embodiments, since the plurality of backup data coming from client device 1 and client device 2 is assigned to storage device 3 and storage device 5, the ranks assigned to the storage devices 3 and 5 may now dynamically change based on current load and utilization capacity of the storage devices 3 and 5.

Further, consider a scenario where the storage device 3 and storage device 5 both are capable of complying with the performance requirement for backing up the plurality of backup data coming from the client device 1. In such scenarios, the plurality of backup data may be allocated to storage device 5 instead of storage device 3 since the rank of storage device 5 is less than the rank of storage device 3.

Furthermore, consider another scenario where more than one client device is determined to have same AD value. In such scenarios, the plurality of backup data belonging to the client devices may be allocated in an ascending order of their respective RC values. As an example if client device 1 and client device 2 have the same AD of 60 seconds and RC value of 30 and 50 respectively. In such scenarios, the plurality of backup data belonging to the client device 1 may be allocated first to a storage device since the RC value is less.

Figure 3:
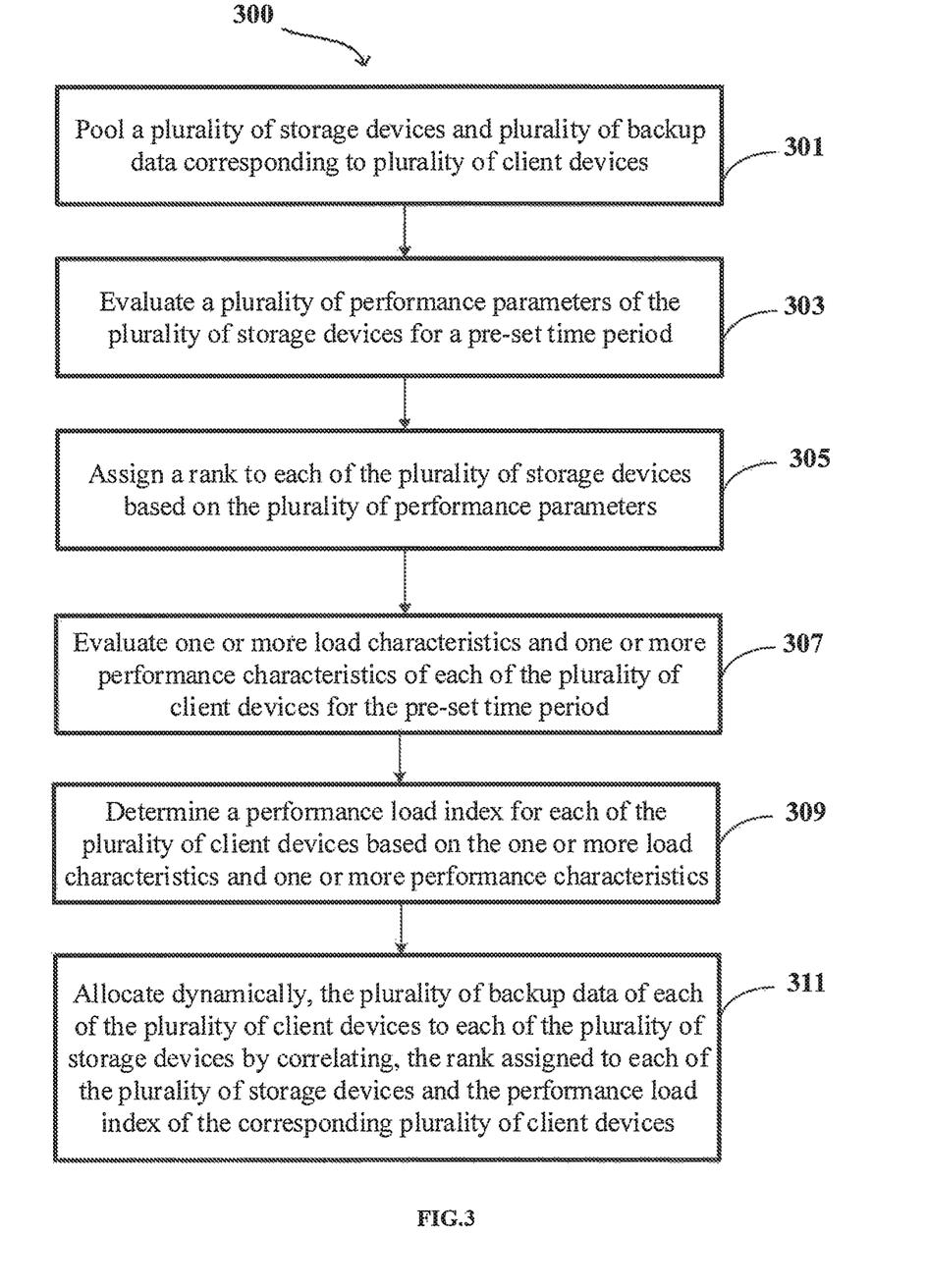
FIG. 3 shows a flowchart illustrating a method of dynamically controlling plurality of backup data on plurality of storage devices in accordance with some embodiments of the present disclosure.

FIG. 3 shows a flowchart illustrating a method of dynamically controlling plurality of backup data on plurality of storage devices in accordance with some embodiments of the present disclosure.

As illustrated in FIG. 3, the method 300 comprises one or more blocks illustrating a method of dynamically controlling plurality of backup data on plurality of storage devices. The method 300 may be described in the general context of computer-executable instructions. Generally, computer-executable instructions can include routines, programs, objects, components, data structures, procedures, modules, and functions, which perform functions or implement abstract data types.

The order in which the method 300 is described is not intended to be construed as a limitation, and any number of the described method blocks can be combined in any order to implement the method 300. Additionally, individual blocks may be deleted from the methods without departing from the spirit and scope of the subject matter described herein. Furthermore, the method 300 can be implemented in any suitable hardware, software, firmware, or combination thereof.

At block 301, the method 300 may include pooling, by a processor 109 of the data allocating system 107, a plurality of storage devices 105 associated with the data allocating system 107 and plurality of backup data corresponding to plurality of client devices 103 associated with the data allocating system 107.

At block 303, the method 300 may include evaluating, by the processor 109, a plurality of performance parameters of the plurality of storage devices 105 for a pre-set time period. In some embodiments, the plurality of performance parameters may include, but not limited to, total utilization capacity of the storage device, capacity available for backup on the storage device, busy status of the storage device, trend of backup data observed on the storage device, average throughput of the storage device, current load on the storage device and expected load on the storage device.

At block 305, the method 300 may include assigning, by the processor 109, a rank to each of the plurality of storage devices 105 based on the plurality of performance parameters. In some embodiments, the rank assigned to each of the plurality of storage devices 105 is directly proportional to capacity available for backup on the corresponding storage device 105, the plurality of performance parameters of the storage device 105 and extent of utilization of the corresponding storage device 105. Further, the rank assigned to each of the plurality of storage devices 105 may vary dynamically based on the plurality of backup data allocated to each of the plurality of storage devices 105.

At block 307, the method 300 may include evaluating, by the processor 109, one or more load characteristics and one or more performance characteristics of each of the plurality of client devices 103 for the pre-set time period. In some embodiments, the one or more load characteristics may be factors that define the plurality of backup data and the one or more performance characteristics may be factors that affect performance of the plurality of client devices 103.

At block 309, the method 300 may include determining, by the processor 109, a performance load index for each of the plurality of client devices 103 based on the one or more load characteristics and one or more performance characteristics. In some embodiments, the performance load index may indicate a backup window required for backing up the plurality of backup data of the corresponding client device 103 and a probability of exceeding the backup window based on the one or more performance characteristics of the client device 103.

At block 311, the method 300 may include allocating, by the processor 109, the plurality of backup data of each of the plurality of client devices 103 to each of the plurality of storage devices 105 by correlating, the rank assigned to each of the plurality of storage devices 105 and the performance load index of the corresponding plurality of client devices 103. Post assignment, recalculate the ranks for plurality of storage devices based on recent workload FIG. 4 is a block diagram of an exemplary computer system for implementing embodiments consistent with the present disclosure.

Figure 4:
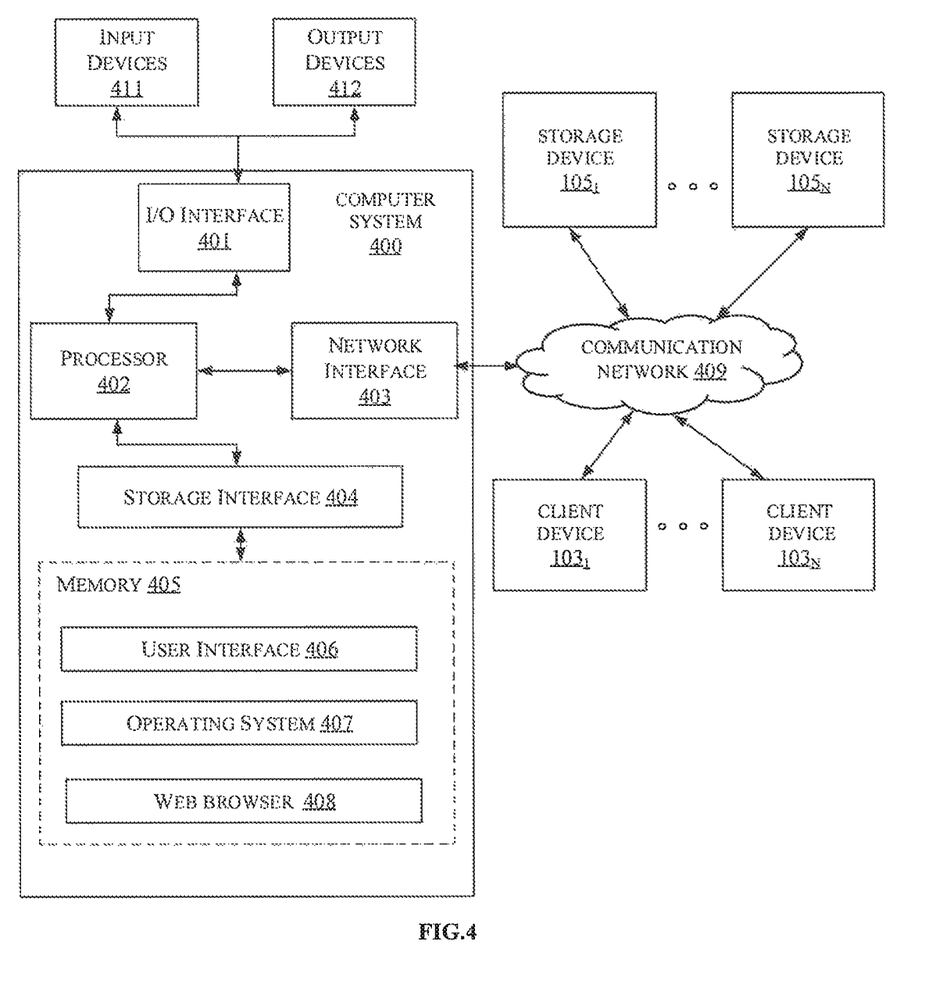
FIG. 4 is a block diagram of an exemplary computer system for implementing embodiments consistent with the present disclosure.

In some embodiments, FIG. 4 illustrates a block diagram of an exemplary computer system 400 for implementing embodiments consistent with the present invention. In some embodiments, the computer system 400 can be data allocating system 107 that is used for dynamically controlling plurality of backup data on plurality of storage devices 105. The computer system 400 may include a central processing unit ("CPU" or "processor") 402. The processor 402 may include at least one data processor for executing program components for executing user or system-generated business processes. A user may include a person, a person using a device such as those included in this invention, or such a device itself. The processor 402 may include specialized processing units such as integrated system (bus) controllers, memory management control units, floating point units, graphics processing units, digital signal processing units, etc.

The processor 402 may be disposed in communication with input devices 411 and output devices 412 via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, the computer system 400 may communicate with the input devices 411 and the output devices 412.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with plurality of client devices 103 ($103_1$ up to $103_n$), and one or more storage devices 105 ($105_1$ up to $105_n$). The communication network 409 can be implemented as one of the different types of networks, such as intranet or Local Area Network (LAN), Closed Area Network (CAN) and such. The communication network 409 may either be a dedicated network or a shared network, which represents an association of the different types of networks that use a variety of protocols, for example, Hypertext Transfer Protocol (HTTP), CAN Protocol, Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. The plurality of client devices 103 may include, but not limited to, a server, a laptop, a desktop, a tablet and a mobile. Further, the plurality of storage devices 105 may include, but not limited to, disk based storage media. In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, a user interface 406, an operating system 407, a web browser 408 etc. In some embodiments, the computer system 400 may store user/application data, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSDD®, OPENBSD, etc.), LINUX® DISTRIBUTIONS (E.G., RED HAT®, UBUNTU®, KUBUNTU®, etc.), IBM®OS/2®, MICROSOFT® WINDOWS® (XP®, VISTA®/7/8, 10 etc.), APPLE® IOS, GOOGLE™ ANDROID™, BLACKBERRY® OS, or the like. The User interface 406 may facilitate display, execution, interaction, manipulation, or operation of program components through textual or graphical facilities. For example, user interfaces may provide computer interaction interface elements on a display system operatively connected to the computer system 400, such as cursors, icons, checkboxes, menus, scrollers, windows, widgets, etc. Graphical User Interfaces (GUIs) may be employed, including, without limitation, Apple® Macintosh® operating systems' Aqua®, IBM® OS/2®, Microsoft® Windows® (e.g., Aero, Metro, etc.), web interface libraries (e.g., ActiveX®, Java®, Javascript®, AJAX, HTML, Adobe® Flash®, etc.), or the like.

In some embodiments, the computer system 400 may implement the web browser 408 stored program components. The web browser 408 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX, DHTML, ADOBE® FLASH®, JAVASCRIPT®, JAVA®, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ACTIVEXm, ANSI® C++/C#, MICROSOFT, .NET, CGI SCRIPTS, JAVAC, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 400 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for dynamically controlling plurality of backup data on plurality of storage devices. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

| Referral numerals | |
|---|---|
| Reference Number | Description |
| 100 | Architecture |
| 103 | Plurality of client devices |
| 105 | Plurality of storage devices |
| 107 | Data allocating system |
| 109 | Processor |
| 111 | I/O interface |
| 113 | Memory |
| 203 | Data |
| 205 | Modules |
| 207 | Monitored data |
| 209 | Parameter data |
| 211 | Load and performance characteristic data |
| 213 | Rank data |
| 215 | Performance index data |
| 217 | Allocation data |
| 219 | Other data |
| 223 | Monitoring module |
| 225 | Pooling module |
| 227 | Evaluating module |
| 229 | Rank assigning module |
| 231 | Index determining module |
| 233 | Data allocating module |
| 235 | Other modules |
| 400 | Exemplary computer system |
| 401 | I/O Interface of the exemplary computer system |
| 402 | Processor of the exemplary computer system |
| 403 | Network interface |
| 404 | Storage interface |
| 405 | Memory of the exemplary computer system |
| 406 | User interface |
| 407 | Operating system |
| 408 | Web browser |
| 409 | Communication network |
| 411 | Input devices |
| 412 | Output devices |

We claim:

1. A method of dynamically controlling plurality of backup data on plurality of storage devices, the method comprising:
    pooling, by a data allocating system, a plurality of storage devices and plurality of backup data corresponding to plurality of client devices (103);
    evaluating, by the data allocating system, a plurality of performance parameters of the plurality of storage devices for a pre-set time period, wherein the plurality of performance parameters are at least one of total utilization capacity of the storage device, capacity available for backup on the storage device, busy status of the storage device, trend of backup data observed on the storage device, average throughput of the storage device, current load on the storage device and expected load on the storage device, wherein the expected load on the storage device is evaluated based on prediction of amount of data to be backed up from each of the plurality of client devices in real-time and the trend of the backup data detected on the corresponding storage device;

assigning, by the data allocating system, a rank to each of the plurality of storage devices based on the plurality of performance parameters;

evaluating, by the data allocating system, one or more load characteristics and one or more performance characteristics of each of the plurality of client devices for the pre-set time period, wherein the one or more load characteristics of the plurality of client devices comprises at least one of amount of backup data, type of the backup data, number of files in the backup data, size of the files and blocks in the backup data, database source, the trend of the backup data and amount of redundant data and wherein the one or more performance characteristics of the plurality of client devices comprises at least one of Central Processing Unit (CPU) availability, memory availability, trend of throughput and network availability at the plurality of client devices for copying the backup data from the plurality of client devices to the plurality of storage devices in the pre-set time period;

determining, by the data allocating system, a performance load index for each of the plurality of client devices based on the one or more load characteristics and the one or more performance characteristics, wherein the performance load index comprises at least one of backup window required for backing up the plurality of backup data of the client device and a probability of exceeding the backup window based on performance of the client device and wherein the backup window for backing up the plurality of backup data is determined based on amount of backup data, trend of throughput and a compression factor, and further wherein; and allocating, by the data allocating system, dynamically, the plurality of backup data of each of the plurality of client devices to each of the plurality of storage devices by correlating, the rank assigned to each of the plurality of storage devices and the performance load index of the corresponding plurality of client devices.

2. The method as claimed in claim 1, wherein the probability of exceeding the backup window is determined based on number of files in backup data, CPU requirement and memory requirement at the time of backup.

3. The method as claimed in claim 1, wherein the rank assigned to each of the plurality of storage devices varies dynamically based on the plurality of backup data allocated to each of the plurality of storage devices.

4. The method as claimed in claim 1, wherein frequency of determining the performance load index for each of the plurality of client devices is based on time intervals predefined in Service Level Agreement (SLA) of each of the plurality of client devices.

5. The method as claimed in claim 1, wherein the rank assigned to each of the plurality of storage devices is directly proportional to capacity available for backup on the corresponding storage device, the plurality of performance parameters of the storage device and extent of utilization of the corresponding storage device.

6. The method as claimed in claim 1, wherein the plurality of backup data corresponding to the plurality of client devices is dynamically allocated to the plurality of storage devices when at least one of plurality of conditions exist, wherein the plurality of conditions are:

when at least one of the plurality of storage devices is running short of capacity available to backup incoming backup data, when performance of at least one of the plurality of storage devices degrades or does not meet required performance for the expected load, and when at least one of the plurality of storage devices is not available for backing up new backup data.

7. The method as claimed in claim 1, wherein the backup data is dynamically allocated to the plurality of storage devices based on one or more predefined allocation policies.

8. A data allocating system for dynamically controlling plurality of backup data on plurality of storage devices (105), the data allocating system comprising:

a processor; and a memory communicatively coupled to the processor, wherein the memory stores the processor-executable instructions, which, on execution, causes the processor to:

pool a plurality of storage devices and plurality of backup data corresponding to plurality of client devices;

evaluate a plurality of performance parameters of the plurality of storage devices for a pre-set time period, wherein the plurality of performance parameters are at least one of total utilization capacity of the storage device, capacity available for backup on the storage device, busy status of the storage device, trend of backup data observed on the storage device, average throughput of the storage device, current load on the storage device and expected load on the storage device, wherein the expected load on the storage device is evaluated based on prediction of amount of data to be backed up from each of the plurality of client devices in real-time and the trend of the backup data detected on the corresponding storage device;

assign a rank to each of the plurality of storage devices based on the plurality of performance parameters;

evaluate one or more load characteristics and one or more performance characteristics of each of the plurality of client devices for the pre-set time period, wherein the one or more load characteristics of the plurality of client devices comprises at least one of amount of backup data, type of the backup data, number of files in the backup data, size of the files and blocks in the backup data, database source, the trend of the backup data and amount of redundant data and wherein the one or more performance characteristics of the plurality of client devices comprises at least one of Central Processing Unit (CPU) availability, memory availability, trend of throughput and network availability at the plurality of client devices for copying the backup data from the plurality of client devices to the plurality of storage devices in the pre-set time period;

determine a performance load index for each of the plurality of client devices based on the one or more load characteristics and the one or more performance characteristics, wherein the performance load index comprises at least one of backup window required for backing up the plurality of backup data of the client device and a probability of exceeding the backup window based on performance of the client device and wherein the processor determines the backup window for backing up the plurality of backup data based on amount of backup data, trend of throughput and a compression factor; and allocate dynamically, the plurality of backup data of each of the plurality of client devices to each of the plurality of storage devices by correlating, the rank assigned to each of the plurality of storage devices and the performance load index of the corresponding plurality of client devices.

9. The data allocating system as claimed in claim 8, wherein the processor determines the probability of exceeding the backup window based on number of files in backup data, CPU requirement and memory requirement at the time of backup.

10. The data allocating system as claimed in claim 8, wherein the rank assigned to each of the plurality of storage devices varies dynamically based on the plurality of backup data allocated to each of the plurality of storage devices.

11. The data allocating system as claimed in claim 8, wherein frequency of determining the performance load index for each of the plurality of client devices is based on time intervals predefined in Service Level Agreement (SLA) of each of the plurality of client devices.

12. The data allocating system as claimed in claim 8, wherein the rank assigned to each of the plurality of storage devices is directly proportional to capacity available for backup on the corresponding storage device, the plurality of performance parameters of the storage device and extent of utilization of the corresponding storage device.

13. The data allocating system as claimed in claim 8, wherein the processor allocates the plurality of backup data corresponding to the plurality of client devices dynamically to the plurality of storage devices when at least one of plurality of conditions exist, wherein the plurality of conditions are:
when at least one of the plurality of storage devices is running short of capacity available to backup incoming backup data,
when performance of at least one of the plurality of storage devices degrades or does not meet required performance for the expected load, and
when at least one of the plurality of storage devices is not available for backing up new backup data.

14. The data allocating system as claimed in claim 8, wherein the processor allocates the backup data dynamically to the plurality of storage devices based on one or more predefined allocation policies.

15. A non-transitory computer-readable medium storing instructions for generating promotion data pertaining to at least one product, wherein upon execution of the instructions by one or more processors, the processors perform operations comprising:
pooling, a plurality of storage devices and plurality of backup data corresponding to plurality of client devices;
evaluating, a plurality of performance parameters of the plurality of storage devices for a pre-set time period, wherein the plurality of performance parameters are at least one of total utilization capacity of the storage device, capacity available for backup on the storage device, busy status of the storage device, trend of backup data observed on the storage device, average throughput of the storage device, current load on the storage device and expected load on the storage device, wherein the expected load on the storage device is evaluated based on prediction of amount of data to be backed up from each of the plurality of client devices in real-time and the trend of the backup data detected on the corresponding storage device;
assigning, a rank to each of the plurality of storage devices based on the plurality of performance parameters;
evaluating, one or more load characteristics and one or more performance characteristics of each of the plurality of client devices for the pre-set time period, wherein the one or more load characteristics of the plurality of client devices comprises at least one of amount of backup data, type of the backup data, number of files in the backup data, size of the files and blocks in the backup data, database source, the trend of the backup data and amount of redundant data and wherein the one or more performance characteristics of the plurality of client devices comprises at least one of Central Processing Unit (CPU) availability, memory availability, trend of throughput and network availability at the plurality of client devices for copying the backup data from the plurality of client devices to the plurality of storage devices in the pre-set time period;
determining, a performance load index for each of the plurality of client devices based on the one or more load characteristics and the one or more performance characteristics, wherein the performance load index comprises at least one of backup window required for backing up the plurality of backup data of the client device and a probability of exceeding the backup window based on performance of the client device and wherein the backup window for backing up the plurality of backup data is determined based on amount of backup data, trend of throughput and a compression factor, and further wherein the probability of exceeding the backup window is determined based on number of files in backup data, CPU requirement and memory requirement at the time of backup; and
allocating, dynamically, the plurality of backup data of each of the plurality of client devices to each of the plurality of storage devices by correlating, the rank assigned to each of the plurality of storage devices and the performance load index of the corresponding plurality of client devices.

16. The medium of claim 15, wherein the rank assigned to each of the plurality of storage devices varies dynamically based on the plurality of backup data allocated to each of the plurality of storage devices.

17. The medium of claim 15, wherein frequency of determining the performance load index for each of the plurality of client devices is based on time intervals predefined in Service Level Agreement (SLA) of each of the plurality of client devices.

18. The medium of claim 15, wherein the rank assigned to each of the plurality of storage devices is directly proportional to capacity available for backup on the corresponding storage device, the plurality of performance parameters of the storage device and extent of utilization of the corresponding storage device.

19. The medium of claim 15, wherein the plurality of backup data corresponding to the plurality of client devices is dynamically allocated to the plurality of storage devices when at least one of plurality of conditions exist, wherein the plurality of conditions are:
when at least one of the plurality of storage devices is running short of capacity available to backup incoming backup data,
when performance of at least one of the plurality of storage devices degrades or does not meet required performance for the expected load, and
when at least one of the plurality of storage devices is not available for backing up new backup data.

20. The medium of claim 15, wherein the backup data is dynamically allocated to the plurality of storage devices based on one or more predefined allocation policies.

* * * * *